United States Patent [19]

Mueller, Jr.

[11] 4,108,248
[45] Aug. 22, 1978

[54] DRAFT AND POSITION CONTROL LINKAGE WITH DEPTH LIMIT FOR A TRACTOR

[75] Inventor: Otto Mueller, Jr., Detroit, Mich.

[73] Assignee: Massey-Ferguson Inc., Detroit, Mich.

[21] Appl. No.: 751,551

[22] Filed: Dec. 17, 1976

Related U.S. Application Data

[63] Continuation of Ser. No. 643,584, Dec. 22, 1975, abandoned.

[51] Int. Cl.² .......................................... A01B 63/112
[52] U.S. Cl. ...................................................... 172/9
[58] Field of Search ............................. 172/7, 8, 9, 10

[56] References Cited

U.S. PATENT DOCUMENTS

| Re. 25,512 | 1/1964 | Presnell et al. | 172/9 |
|---|---|---|---|
| 2,864,295 | 12/1958 | DuShane | 172/9 |
| 3,399,733 | 9/1968 | North | 172/9 |
| 3,412,811 | 11/1968 | Thompson | 172/7 |
| 3,422,906 | 1/1969 | Bunting et al. | 172/9 |
| 3,674,095 | 7/1972 | Roger | 172/7 |
| 3,732,933 | 5/1973 | Foxwell et al. | 172/7 |
| 3,768,570 | 10/1973 | Green | 172/9 |
| 3,901,323 | 8/1975 | Mueller, Jr. | 172/7 |
| 3,917,002 | 11/1975 | Mueller, Jr. | 172/9 |
| 3,918,527 | 11/1975 | Wagner | 172/9 |

FOREIGN PATENT DOCUMENTS 2,303,460 10/1976 France ........................................ 172/9

*Primary Examiner*—Richard T. Stouffer
*Attorney, Agent, or Firm*—John C. Thompson

[57] ABSTRACT

An improved draft and position control system for a tractor. Independent manually operable draft and position controls are provided for establishing a desired draft and/or position of an implement drawn by a tractor. The position control establishes the maximum lowered position to which the implement may descend and will override any draft signals which would tend to lower the implement beyond this point. The draft control includes the draft responsive member interconnected with a feedback mechanism which will tend to maintain the desired draft on the implement. An additional position feedback is provided which can moderate the draft feedback to prevent undue response of the implement during changes of the draft load. In accordance with the principles of this invention the position feedback which moderates the draft feedback can be infinitely varied between a first setting wherein it fails to moderate to a second setting where it substantially moderates. Furthermore, the moderating position feedback is inoperative over a range of movement corresponding to that movement of the implement above the ground.

12 Claims, 7 Drawing Figures

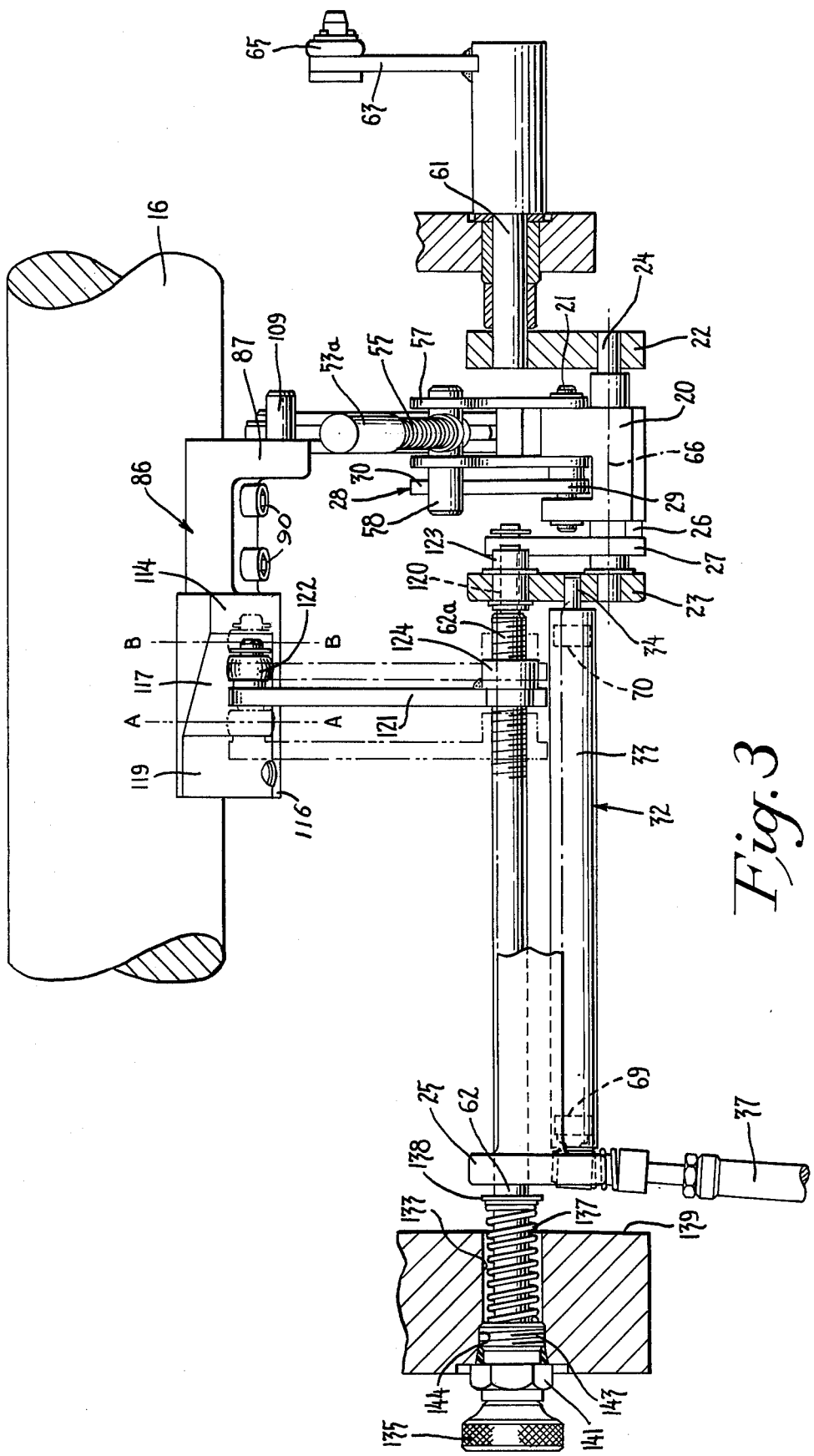

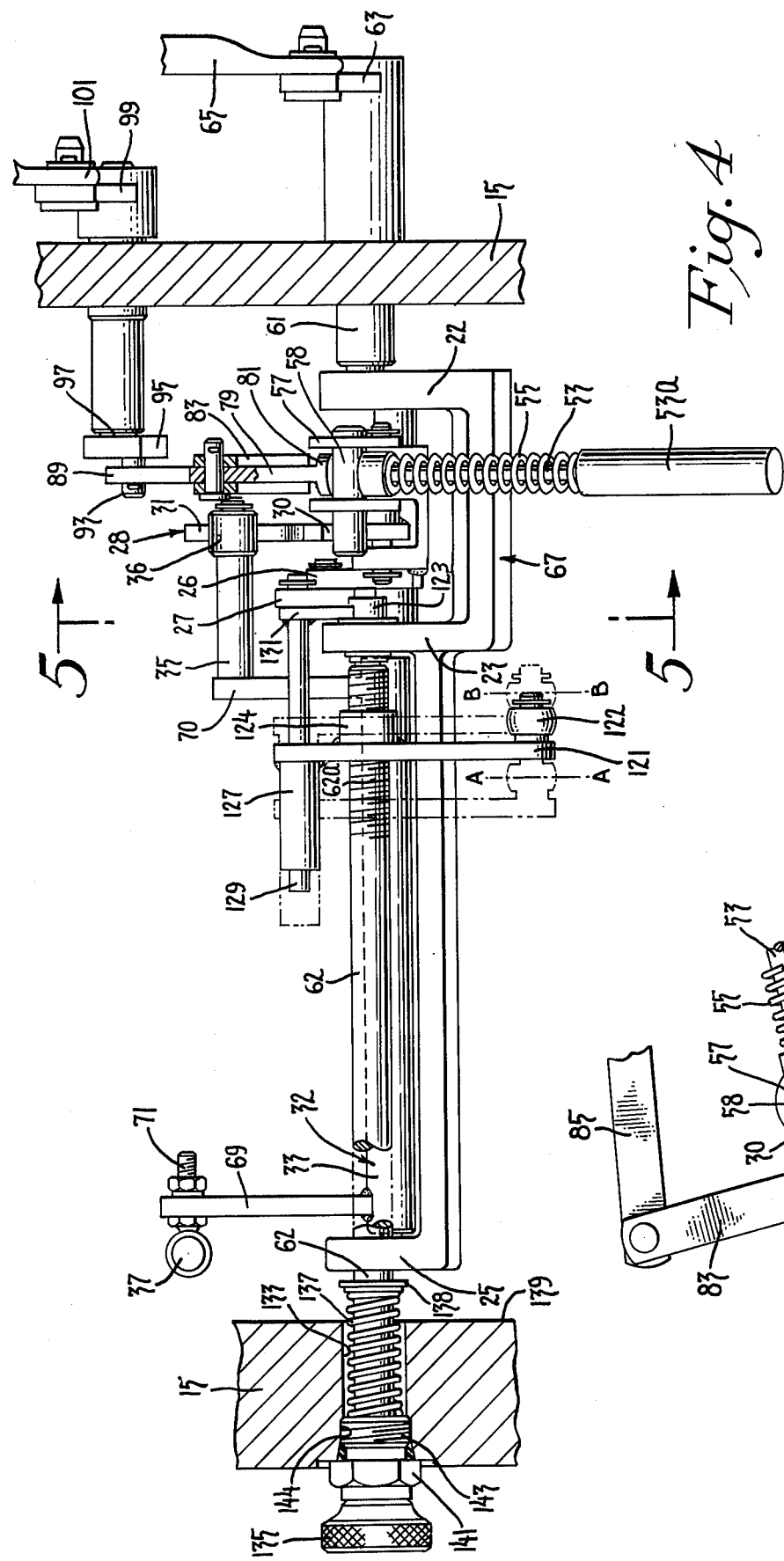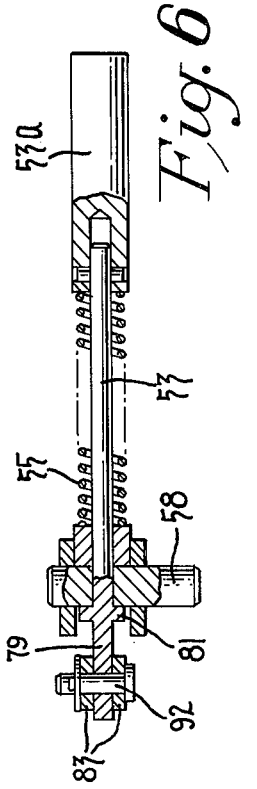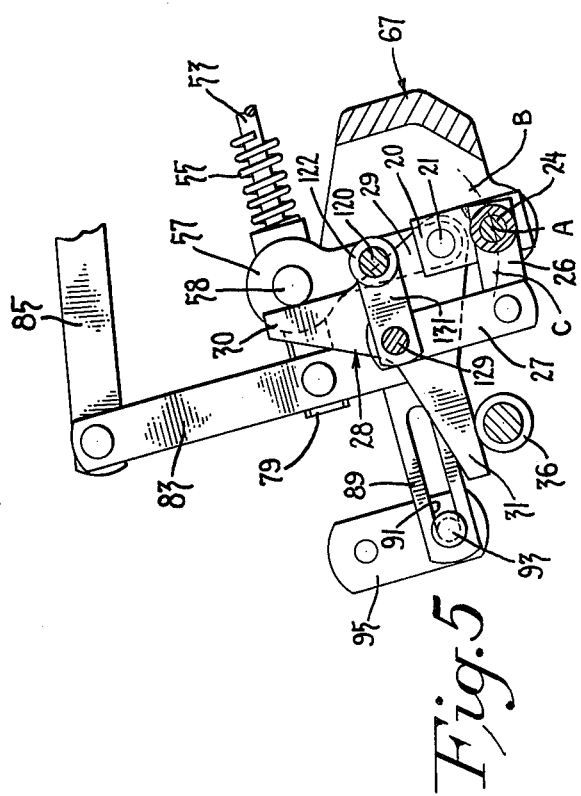

DRAFT AND POSITION CONTROL LINKAGE WITH DEPTH LIMIT FOR A TRACTOR

This application is a continuation of copending U.S. application Ser. No. 643,584 filed Dec. 22, 1975, now abandoned.

This invention relates generally to argicultural tractors of the type provided with an implement hitch, and more particularly to a draft and position control system for such a hitch.

It has long been recognized that when working with a tractor employing a power elevatable three point hitch linkage to which an implement is secured that it is desirable to provide various controls for controlling the elevation of the hitch. Two of the most widely used controls are position control and draft or load control. In the past it has been common to provide a tractor with one or the other or both of these controls.

When employing solely position control a position control lever is set to establish a desired position of the three point hitch with respect to a plane established by the tractor. The position control lever when moved will send a command signal to the power elevatable hitch to either raise or lower the hitch. A position feedback system is employed which will stop the movement of the hitch once the desired position is obtained. The position will be maintained until changed by the operator. In a tractor employing solely draft control the tractor will be provided with a draft sensing device which is interconnected with the mechanism for elevating or lowering the implement hitch to either raise the hitch as the draft increases or to lower the hitch as the draft decreases.

It has been recognized in the prior art that in many situations each of these systems by itself is not entirely satisfactory. Thus, the prior art discloses a number of systems employing both position and draft control. In one such system position control is employed solely to override draft control should there be a tendancy for the draft signal to cause the implement to be lowered too far with respect to the tractor. In another system the implement can be controlled by solely position control, solely draft control, or an intermixed control wherein a position feedback signal is used to moderate the draft feedback signal of draft control. The prior art has also recognized that the last two systems may be combined. It was furthermore recognized that it may be desirable to moderate the draft feedback signal in varying degrees.

According to the principles of this invention the foregoing systems are further refined and improved by providing additional functions and capabilities not possible in any known prior art system. Thus, it is a feature of this invention to provide a draft and position override system employing position feedback for moderating a draft feedback wherein the moderating position feedback can be varied from a first setting where it has no effect upon the draft feedback to a second setting wherein it has a substantial effect. It is a further feature of this invention to provide a draft control system having position feedback which moderates the draft feedback signal wherein the position feedback is inoperative during that portion of the movement of the implement hitch which represents the vertical movement of an implement above the surface of the ground.

The foregoing features will be apparent from the following detailed description taken in conjunction with the accompanying drawings in which a preferred form of this invention is illustrated.

FIG. 3 is a generally vertical sectional view taken along the lines 3—3 in FIG. 2.

FIG. 4 is a plan view of the portion of the control linkage shown in FIG. 3.

FIG. 5 is a sectional view taken along the line 5—5 in FIG. 4.

FIG. 6 is a sectional view taken along the line 6—6 of FIG. 2.

In the following description right and left hand references are determined by standing behind the tractor and facing its direction of travel. Front and rear reference refers to the front and rear portions of the tractor. Clockwise and counterclockwise reference is determined by standing to the left of the tractor and facing the tractor.

Figure 1:
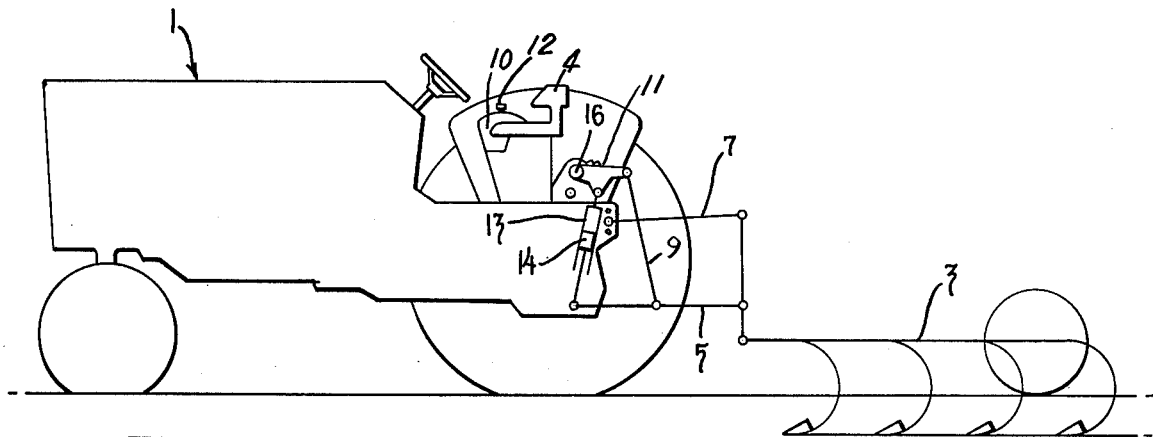
FIG. 1 illustrates a hitch which is useable to interconnect an implement to a tractor, the control system of this invention being useable with such a hitch.

Referring now to FIG. 1, a tractor, indicated generally at 1, is shown interconnected with a semimounted implement such as a plow 3 by a conventional three point hitch including lower draft links 5 and an upper link 7. The forward ends of the links 5 and 7 are pivotally secured to the tractor and the lower draft links may be raised and lowered by means of lift links 9, the upper ends of which are connected to lift arms 11 which are in turn secured to a rock shaft 16. The lift arms can be moved upwardly and downwardly by a single acting hydraulic motor including a cylinder 13 and piston 14. The hydraulic unit 13, 14 is connected with signal responsive means in the form of a control device or valve V (FIGS. 2 and 7) by a fluid line 44. The valve is connected with a pump through line 42 and a sump through line 46. The valve has an element shiftable between a centered or neutral position and supply and discharge positions. When the valve element is in its right hand or supply position fluid will be directed from the inlet 42 into the cylinder 13 to cause the draft links 5 to be raised. When the valve element is in its left hand or discharge position fluid within the cylinder will be exhausted through line 46 to permit the draft links to be lowered. When the valve element is in its centered position fluid within the cylinder will be trapped causing the draft links to be maintained in their existing position. The valve element has a laterally outwardly extending plunger shaft 41 which is biased to the right by spring 56 to maintain engagement of the right hand end of the shaft 41 with one arm of a bell crank lever 43.

The tractor is provided with a control console 10 to the right of the operator's station or seat 4, the control console being provided with two independent manually operable levers 12 (only one of which is illustrated) which are utilized to set the desired position and draft controls. In addition, a rotatable knob 135 is disposed on the exterior of the tractor, which knob is utilized to vary the proportions of feedback signals.

Before describing the various controls in detail they will briefy be summarized. One of the levers 12 is utilized to establish the desired draft load imparted to the tractor by the implement. This control will send a command signal to the valve to cause the draft links 5 to be either raised or lowered. For example, if the draft control lever 12 is moved in one direction, it will transmit a command signal to the valve to increase the draft and the fluid within the cylinder assembly 13, 14 will be exhausted causing the implement to lower. A draft feedback system is provided which will shift the valve element to its centered position once the desired draft has been obtained. The draft feedback system will also cause the valve element to shift as the draft varies to either raise or lower the implement. In order to prevent undue movement of an implement a position feedback system is connected with the draft feedback system to selectively moderate the draft feedback signal and the amount of position feedback can be varied by rotating the knob 135. By shifting the position control lever 12 in one direction the operator will cause a command signal to be transmitted to the valve to lower the draft links. A feedback position mechanism is employed to shift the valve to the centered position when the desired position is achieved. The draft control and the position control may be used independently of each other, or may be used in combination. When used in combination the position control acts to establish a floor below which the implement may not descend. Thus, position control will override a draft control signal in the event that the draft control signal may tend to shift draft links lower than that position established by position control. A transport shut-off control is provided which acts to shift the valve to the neutral position when the desired transport position is obtained after raising the draft links. The transport shut-off control will override either the position control or the draft control. As the transport shut-off control acts only in a response to a lift signal imparted by another part of the system no separate hand controls are provided.

Figure 2:
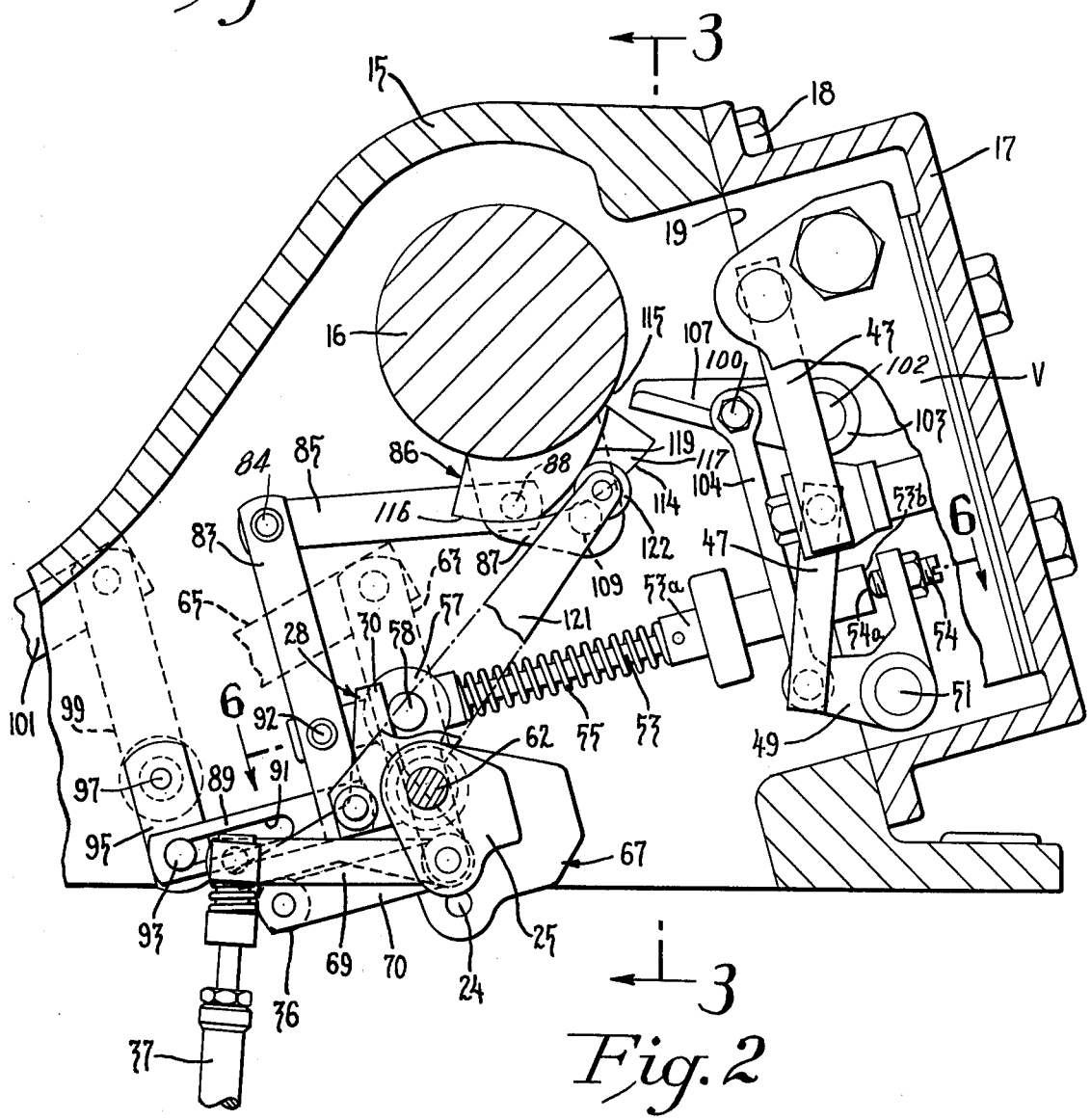
FIG. 2 is a cross-sectional view through a portion of the tractor showing control linkage utilized in positioning the hitch relative to the tractor.

Referring now to FIG. 2, the controls for the valve are mounted in part in a housing including a base or main part 15 having a large rear opening 19 covered by a detachable part 17, which may be removed for servicing. The detachable part 17 is secured in place by bolts 18.

As previously noted the valve element is operated by a plunger shaft 41 the outer end of which engages a first bell crank 43 which is pivoted on a fixed shaft 45. The other arm of the bell crank 43 is secured to a ball joint on one end of link 47, the other end of link 47 being mounted on a ball joint carried at the end of one arm of a bell crank 49 which is mounted for rotatable movement about a transversely extending fixed shaft 51. Movement of the second bell crank 49 will cause corresponding movement of the bell crank 43 and the plunger shaft 41. The other arm of the crank 49 carries an adjustable screw 54 having a curved surface 54a which bears against the flat end surface 53b of the enlarged portion 53a of a control rod 53. The spring 56 acting through the first and second bell cranks 43, 49 will normally maintain surface 54a in contact with the surface 53b except when the transport shut-off control overrides the draft and position signals transmitted through the rod 53.

The purpose of the adjusting screw 54 is to adjust for tolerance variations in the linkage which extends from the draft control quadrant lever 12 to the rear end of the control rod 53. Thus, with the position control quadrant lever 12 disposed in its forward position, the screw 54 is adjusted to dispose the valve spool in a neutral position when the draft control quadrant lever 12 is in a predetermined intermediate position. This adjustment is customarily done at the factory and it is usually not necessary for the tractor operator to further adjust the screw.

The transport control means, which are provided to establish the desired maximum raised position for the draft links, include a bell crank member 103 which is rotatable about the axis of an associated fixed shaft 102. A link 104 is provided with eyes at either end, one eye being mounted about the shank of a bolt 100 which is secured to one arm of the bell crank 103, and the other being mounted about a shank of the ball joint on bell crank 49. An adjustable stop or screw 105 is provided on the other arm of the bell crank 103. The screw 105 may be adjusted to vary the maximum raised position of the draft links. Transport sensing means are provided which are operable to compare the actual position of the draft links with the desired maximum raised position, established by the setting of the screw 105, and to shift the valve means to its centered position when the desired maximum raised position is attained. The transport sensing means includes a bell crank 107 rotatable about the axis of the shaft 102, the lower surface of one arm of the bell crank being contactable by a pin 109 carried by the flange 87 of a cam member indicated generally at 86, the cam member being mounted on the rock shaft 16 by fasteners 90. As the rock shaft is rotated in a counterclockwise direction to raise the draft links 5 the pin 109 will contact the associated arm of the bell crank 107 causing the bell crank 107 to rotate in a clockwise direction. As the bell crank 107 is rotated in a clockwise direction the surface 111 of the other arm will contact one end of the screw 105 to then cause the bell crank 103 to also be rotated in a clockwise direction. Clockwise rotational movement of the bell crank 103 will then cause the valve element and plunger shaft to be shifted to the left through links 104 and 47 and bell crank 43. As this event happens the bell crank 49 will also be shifted in a clockwise direction shifting the stop surface 54a away from the end 53b of the rod 53. It can thus be seen that the transport shut-off control will override any signal from the various control means associated with the control rod 53.

Both the draft control and position control transmit various signals to the valve through the control rod 53, which is slideably supported. The intermediate portion of the control rod 53 is in part surrounded by a spring 55, the rear end of the spring bearing against the forward end of the enlarged portion 53a, and the forward end of the spring bearing against the rear end of a sleeve member 60. The forward end of the sleeve member 60 will at all times bear against a trunnion 58 carried by the upper end of a forked operating lever 57. A forward extension 79 of the control rod 53 is provided with a fixed flange 81 which may also bear against the trunnion 58 on that side opposite from the sleeve member 60. The compression spring 55 will normally bias the control rod 53 rearwardly and when the control rod assembly 53 is solely under the influence of draft control it will always be in the position illustrated in FIG. 6. However, the control rod 53, when under the overriding influence of position control may be shifted forwardly with respect to the trunnion 58 to cause the spring 55 to be compressed and the flange 81 to move away from the trunnion 58.

The draft control system will now be described and for the purposes of this discussion it will be assumed that position control quadrant lever 12 is in its lowered position. The manually operable draft control quadrant lever 12 will be shifted to an intermediate position to transmit a draft load command signal to the valve through the rod 53. The draft control quadrant lever 12 is interconnected with a cradle indicated generally as 67 by means of a link 65 the rear end of which is pivotally secured to the upper end of a rock arm 63. The rock arm 63 is fixed on a shaft 61, and an intermediate portion of the shaft 61 is journaled for rotation in the housing 15. The left hand end of the shaft 61 is fixed within an aperture of the right hand leg 22 of the cradle 67. The cradle is provided with a left hand leg 25 which is apertured and is rotatably mounted about a shaft 62. The left hand end portion of shaft 62 is rotatably supported in a left hand portion and the right hand end portion 120 is journaled in an apertured bushing 123 carried by an intermediate leg 23 of cradle 67. The shafts 61 and 62 have a common axis 59. It should be observed at this point that rocking of the rock arm 63 will cause the cradle 67 to be rocked about the axis 59. A lower pivot shaft 24 extends between the legs 23 and 24 and is disposed below the axis 59 (FIG. 2). The lower portion of a rocking block 20 is journaled about shaft 24. The upper portion of the rocking block 20 carries an upper pivot shaft 21 and the lower end of the forked operating lever 57 is journaled about the shaft 21. An arm 29 of a tri-armed cam 28 is also journaled about the shaft 21. Another arm 30 bears against the forward edge of that portion of trunnion 58 which extends to the left of the forked operating lever 57. The third arm 31 of the cam 28 bears against the upper surface of a roller 36 which is interconnected with the vertically shiftable rod 37 of draft sensing means which may be of any conventional construction which will cause the rod 37 to be shifted upwardly as the draft load decreases and downwardly as the draft load increases. The structure which interconnects the roller 36 with the rod 37 is generally indicated at 32 and includes a rotatable sleeve member 33 supported by opposed right and left hand coaxial pins 34 supported on arms 24, 25 respectively of the cradle member 67. Right and left radially outwardly extending arms 70, 69 are secured to the sleeve 33. The outer end of the left hand arm 69 is interconnected with the upper end of the rod 37 through a pin 71. The outer end of the arm 70 is interconnected with the roller 36 by means of a right angled extending portion 35.

Figure 7:
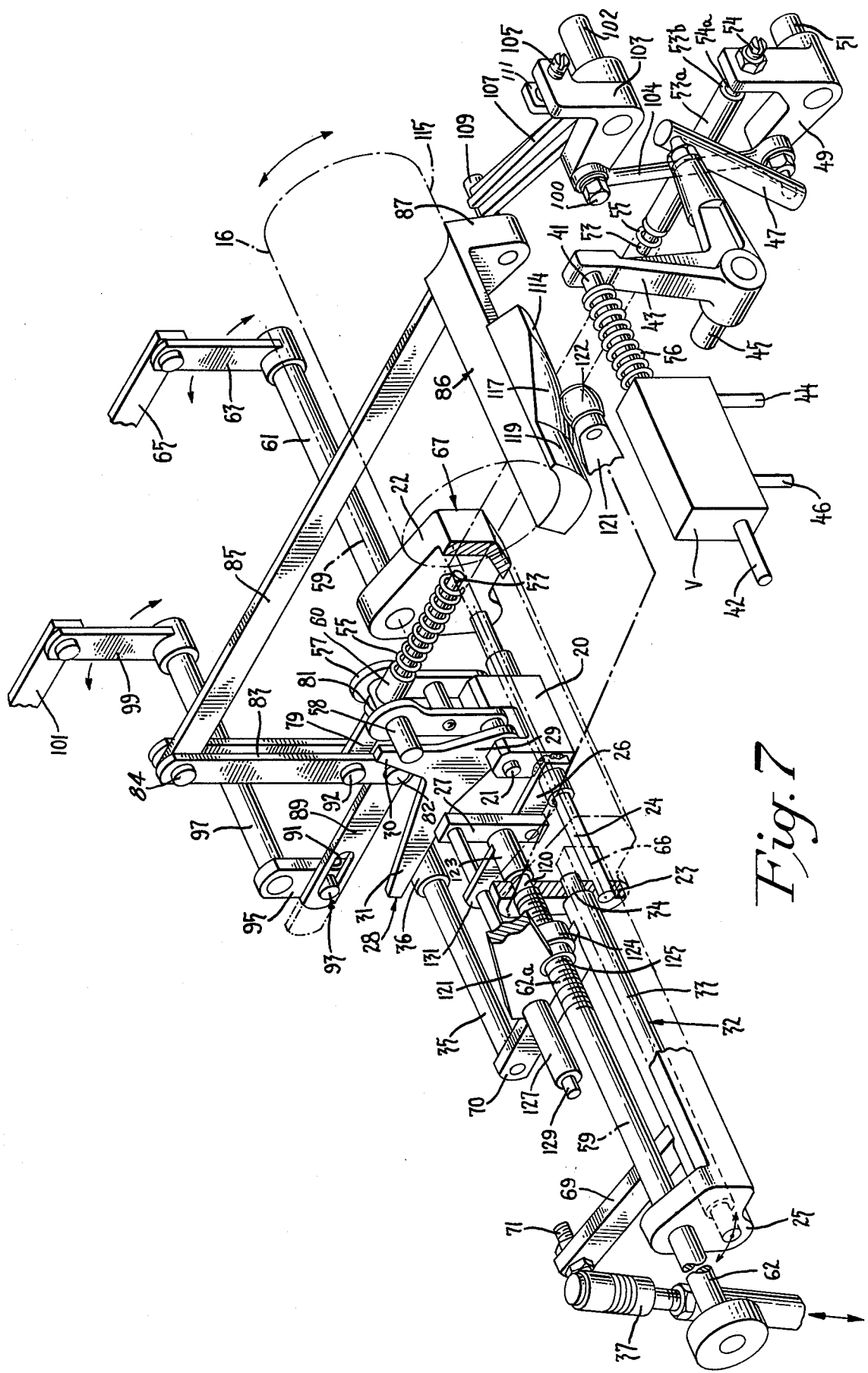
FIG. 7 is a perspective view of the control system of this invention.

Referring now to FIGS. 5 and 7, if the link 65 is moved in a forward direction a "lower" draft load command signal will be transmitted to the valve "V" by rotation of the cradle 67 which will in turn cause the rocking block 20 to be shifted rearwardly from position A (FIG. 5) towards position B causing attendent rearward shifting movement of the control rod 53 which will in turn cause the valve element to be shifted to the left thus permitting the implement to be lowered. As the implement is lowered into the ground the draft sensing means will cause the rod 37 to be shifted downwardly as the draft load increases. Thus, the draft sensing means acting through roller 36, cam 28, trunnion 58 and the control rod 53 acts as a draft feedback means capable of transmitting a draft feedback signal to the valve. As the draft load increases the cam 28 will rotate in a counter-clockwise direction about the upper pivot shaft 21 thereby shifting the trunnion in a forward direction. The valve is shifted to the neutral position when the desired draft load is achieved.

It had been found that a pure draft feedback signal is frequently not desirable and thus a variable position feedback mechanism is incorporated to selectively moderate the draft feedback signal. The variable feedback means includes the cam 86 and shiftable means in the form of a cam follower 122 mounted upon a lever 121 which is provided with a sleeve 124 having an internal threaded surface 125. This sleeve 124 engages a threaded portion 62a of rod 62. The end of the lever 121 remote from the roller 122 is provided with a transversely extending sleeve member 127 which slideably receives a rod 129, a portion of the rod 129 to the right of the sleeve 127 being fixed to the outer end of a lever 131. The other end of the lever 131 is fixed to the outer surface of the apertured bushing 123 which is rotatably supported on leg 23. The right hand end of rod 129 projects to the right of lever 131 and one end of a link 27 is rotatably mounted thereon. The lower end of the link 27 is in turn pivotally interconnected with the forward end of an arm 26, the rear end of the arm being secured to the rock block 20. The spring 56 acting through bell cranks 43 and 49, link 47, control rod 53, trunnion 58, cam 28, the rocker block 20 and the associated structure described immediately above will bias the cam roller 122 into contact with the surface of the cam 86. It should be obvious at this point that rotation of the knob 135 which is fixed to the rod 62 will cause the lever 121 and cam follower 122 to be shifted laterally across the surface of the cam 86.

With reference to FIGS. 3 and 4 it can be seen that the left hand end of the rod 62 passes through aperture 133 of the housing 15. A coil spring 137 encircles the left hand end portion of the rod 62, the right hand end of the spring 137 abutting a stop 138 disposed adjacent the inner surface 139 of the housing 15. The other end of the spring 137 abuts a sleeve nut 141 encircling the rod and disposed inwardly of the knob 135. The outer periphery of the sleeve 141 is threaded as at 143 to engage corresponding threads 144 in the housing. With the sleeve 141 secured in the housing rod 62 may be rotated by the knurled knob 135 to position the lever 121 at various positions laterally along the face of the cam as indicated by the phantom line position A—A and B—B in FIG. 3.

In accordance with the principles of this invention the cam 86 is provided with a special contoured surface spaced to the left of flange 87. The inner surface of the cam member 86 conforms in curvature with the outer peripheral surface 115 of the rock shaft 16 and is held in place by suitable fasteners 90. The cam surfaces include a laterally extending surface portion 116 concentric with the axis of the rock shaft 16, and offset additional surfaces including first, second and intermediate surface portions. The first radially offset surface portion 114 is concentric with the axis of the rock shaft and can be considered as an extension of the cylindrical surface 116. The second radially offset surface portion 119 is also generally cylindrical, however, it should be noted that the cylindrical surface 119 is generated about an axis offset from the axis of the rock shaft 16, but of the same radial length. The radially offset intermediate surface 117 extends between the first and second surfaces 114, 119. In a preferred embodiment the surface 117 is circular in cross section, the radius being the same as the radius for the surfaces of 114, 119. However, the center point for each incremental section of the surface 117 varies as the center point shifts from the axis of surface 114 to the axis of the surface 119.

The position control means and its associated position feedback means are interconnected with the control lever 53 by means of a floating lever 83, an intermediate portion of which is secured to the forward end of extension 79 of the control rod 53 by intermediate pin 92. The upper end of the floating lever or link 83 is in turn pivotally secured to the forward end of a position feedback link 85 by pivot pin 84. The rear end of link 85 is in turn pivotally secured to the flange 87 on the cam member 86 by pivot pin 88. The position control lever 12 is in turn interconnected with the floating link 83 by means of link 101, the rear end of which is pivotally secured to the upper end of arm 99 which is fixed on rotatable shaft 97. An intermediate portion of the shaft 97 passes through the right hand wall of the housing 15 and in turn carries a downwardly extending fixed arm 95. The lower end of the arm 95 carries a pin 93 which is received within an elongated slot 91 at the forward end of a link 89, the rear end of the link 89 being in turn pivotally interconnected to the lower end of floating link 83 by pivot pin 82.

The operation of the draft and position control will now be described. When the tractor operator desires to operate solely in position control the control lever 12 for the draft control will be shifted to cause link 65 to be shifted to its forward position. This will cause the trunnion 58 to shift rearwardly which will in turn cause the forward end of slot 91 to engage the pin 93 and to shift the flange 81 out of contact with the trunnion 58 thereby compressing the spring 55. Movement of the position control lever 12 in its lowered direction will now cause the pin 93 to move rearwardly. The spring 55 will cause the forward end of the slot 91 to be maintained in engagement with the pin 93 and this movement will cause the rear end of the rod 53 to shift rearwardly to cause the valve to permit fluid to be discharged from the cylinder assembly 13, 14. As the fluid is exhausted from the cylinder assembly the rock shaft 16 will rotate in a clockwise direction until the feedback link shifts the floating link 83 to a position wherein the valve is again shifted to a centered position wherein it will maintain the fluid within the cylinder. Variations in draft will not affect this setting as movement of the trunnion 58 will not affect the position of the rear end of the rod 53a as it is being held from movement by the contact of the forward end of the slot 91 with the pin 93.

When the tractor operator desires to operate the tractor solely in draft control the position control lever 12 is shifted all the way to cause link 101 to be shifted all of the way to the front which will then dispose the pin 93 out of contact with the forward end of the slot 91. Under this condition the rod 53 will always be fully extended and draft commands transmitted by the rocking cradle 67 will be transmitted through the trunnion 58 to the valve until counteracted by the draft feedback operating through the control rod 37, roller 36 and to the trunnion 58 through cam 28. The operator may selectively moderate the draft feedback signal, however, such moderation does not take place when the implement is in a position above the ground. If the draft feedback signal were moderated throughout the range of movement of the hitch when the implement is raised out of the ground operation of the hitch would be retarded as the position feedback imposed upon the draft feedback through the cam 86 and cam follower would be giving a signal to lower, thus retarding movement of the hitch. Accordingly, the roller 122 will be in contact with that portion of the cam surface indicated at 116 when the implement is above the ground and will not impart any feedback signal to the command signal imparted by the draft control lever.

The draft feedback signal can be moderated at varying rates. Thus, the cam follower is laterally shiftable from a position wherein it engages surfaces 114 during that portion of movement of the implement when the implement is below the surface of the ground to a position wherein it contacts surface 119. When it is in the position where it contacts surface 114 it will not moderate the draft signal.

This is desirable when working in severely undulating terrain as it is necessary that the hitch be fully responsive to changes in draft. However, it is customary that some draft feedback may be desirable and thus the roller will customarily be in contact with either surface 117 or 119. When in contact with either of these surfaces it should be observed that the linkage associated with the cam follower will moderate a draft feedback signal. For example, if the draft load were increasing the rod 37 would be shifted downwardly which would cause attendant forward movement of the control rod 53 which will in turn cause the valve to be shifted to a position wherein the cylinder assembly 13, 14 will be extended to raise the hitch links. As the rock shaft 16 is rotated during this raising movement the cam follower will engage the cam surface 117 or 119 rocking the lever 121 in a clockwise direction. This will in turn cause the rocking block 20 to be rotated in a similar direction imparting a rearward movement to the rod 53. If the downward movement of the rod 37 is considered as a positive signal, the clockwise movement of the lever 121 can be considered to be imparting a negative signal and these two signals are summed. The summation of these signals will still be a positive value, but less than that imparted solely by the movement of the rod 137. Thus, the position feedback will moderate the signal, but not cancel it. Cancelling of the draft feedback signal will take place, in the absence of a change in the draft command signal, when the draft load again attains that value which has been preset by the draft command lever.

What is claimed is:
1. A control system for a tractor or the like having draft link means vertically shiftable between raised and lowered positions, and signal responsive means operable to either raise, maintain or lower the draft link means; said control system including:
   first and second independent manually operable control means, said first control means being capable of transmitting a desired draft load command signal to said signal responsive means, and said second control means being capable of transmitting a desired draft link means position command signal to said signal responsive means;
   draft feedback means including draft load sensing means, the draft feedback means being capable of transmitting a draft feedback signal to said signal responsive means;
   variable first position feedback means; and
   second position feedback means capable of transmitting a draft link means position feedback signal to said signal responsive means;
   characterized by said variable first position feedback means having shiftable means from a first position to a second position, said shiftable means being incapable of moderating a draft feedback signal when in the first position and being capable of moderating the draft feedback signal when in the second position.

2. The control system set forth in claim 1 wherein the shiftable means is infinitely variable between the first and second positions.

3. The control system set forth in claim 1 wherein the variable position feedback means includes a cam mounted for movement about a fixed axis, said cam including a first surface portion concentric with said axis, a second surface portion which is generally cylindrical and offset with respect to the axis of rotation, and an intermediate surface portion which varies between the first and second surfaces.

4. The control system set forth in claim 3 wherein said cam is mounted on the tractor rock shaft, the rock shaft being interconnected with the draft link means and being rotatable to change the desired vertical position of the draft link means.

5. The control system set forth in claim 3 wherein the shiftable means is a cam follower laterally shiftable from a first position wherein the cam follower is in contact with the first surface of the cam through intermediate positions to a second position wherein the cam follower is in contact with the second surface of the cam.

6. The control system set forth in claim 5 wherein the cam follower is mounted on a lever a portion of which is provided with a threaded aperture, the control system further being characterized by the provision of a rotatable threaded rod which passes through the threaded aperture in said lever, the threaded rod being rotatable to infinitely vary the lateral position of the cam follower between the first and second position.

7. The control system set forth in claim 1 further characterized by said variable first position feedback means being incapable of moderating the draft feedback signal during a portion of the movement of the draft link means between a fully raised position and an intermediate position and further by being capable of selectively moderating a draft feedback signal as the draft link means move between said intermediate position and a fully lowered position.

8. The control system as set forth in claim 7 wherein the variable feedback means includes a cam mounted on the tractor rock shaft, the rock shaft being interconnected with the draft link means and being rotatable to change the desired vertical position of the draft link means, said cam including a laterally extending surface portion concentric with the axis of said rock shaft, and radially offset additional surface means including a first surface portion concentric with said axis, a second surface portion which is generally cylindrical and offset with respect to the axis of the rock shaft, and an intermediate surface portion which varies between the first and second surfaces.

9. The control system set forth in claim 8 wherein the shiftable means is a cam follower laterally shiftable from a first position wherein the cam follower is in contact with the first surface portion of the cam through intermediate positions to a second position wherein the cam follower is in contact with the second surface portion of the cam.

10. A control system for a tractor or the like having draft link means vertically shiftable between raised and lowered positions, and signal responsive means operable to either raise, maintain, or lower the draft link means; said control system including:
manually operable draft control means capable of transmitting a desired draft load command signal to said signal responsive means;
draft feedback means including draft load sensing means, said draft feedback means being capable of transmitting a draft feedback signal to said signal responsive means; and
variable position feedback means;
characterized by said variable position feedback means being incapable of moderating the draft feedback signal during a portion of the movement of the draft link means between a fully raised position and an intermediate position and further by being capable of moderating the draft feedback signal as the draft link means move between said intermediate position and a fully lowered position.

11. The control system set forth in claim 10 wherein the variable position feedback means includes a cam mounted for movement about a fixed axis, said cam including a laterally extending surface portion concentric with said axis and radially offset additional surface means having a portion which is generally cylindrical and offset with respect to the axis of rotation.

12. The control system set forth in claim 11 wherein said cam is mounted on the tractor rock shaft, the rock shaft being interconnected with the draft link means and being rotatable to change at the desired vertical position of the draft link means, the variable position feedback means including a cam follower which contacts the laterally extending portion as the rock shaft and draft link means are rotated between a fully raised position and an intermediate position and the cam following means contacting the radially offset additional surface means as the rock shaft and draft link means are rotated between an intermediate position and a lowered position.

* * * * *

UNITED STATES PATENT OFFICE
CERTIFICATE OF CORRECTION

Patent No. 4,108,248  Dated August 22, 1978

Inventor(s) Otto Mueller, Jr.

It is certified that error appears in the above-identified patent and that said Letters Patent are hereby corrected as shown below:

In claim 1, line 63 of the patent after "means" [second occurence] insert --shiftable--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks